United States Patent [19]
Chenausky

[11] Patent Number: 5,097,472
[45] Date of Patent: Mar. 17, 1992

[54] PREIONIZED TRANSVERSELY EXCITED LASER

[76] Inventor: Peter P. Chenausky, 151 Deercliff Rd., Avon, Conn. 06001

[21] Appl. No.: 483,243
[22] Filed: Feb. 22, 1990
[51] Int. Cl.$^5$ .............................................. H01S 3/00
[52] U.S. Cl. ........................................ 372/38; 372/69; 372/86
[58] Field of Search ........................ 372/38, 86, 83.6

[56] References Cited

U.S. PATENT DOCUMENTS

| | | | |
|---|---|---|---|
| 4,380,079 | 4/1983 | Cohn et al. | 372/86 |
| 4,534,035 | 8/1985 | Long | 372/86 |
| 4,612,643 | 9/1986 | Long et al. | 372/86 |
| 4,689,819 | 10/1987 | Hirth et al. | 372/86 |
| 4,748,635 | 5/1988 | McLella | 372/86 |

Primary Examiner—Léon Scott, Jr.
Attorney, Agent, or Firm—Chilton, Alix & Van Kirk

[57] ABSTRACT

Co-ionization of the gas in the optical cavity of a laser, the laser employing only two electrodes, is accomplished by employing a low energy source to commute a non-switched higher energy source. The low energy source will generate a discharge in the laser medium thereby causing power to be deposited from the higher energy source into the laser medium.

22 Claims, 2 Drawing Sheets

PREIONIZED TRANSVERSELY EXCITED LASER

BACKGROUND OF THE INVENTION

1. Field of the Invention

The present invention relates to the generation of coherent light and particularly to improvements in gas lasers. More specifically, the present invention is directed to enhancing the efficiency of pulsed discharge gas lasers, and especially transversely excited lasers, through co-ionization employing low and high energy sources. Accordingly, the objects of the present invention are to provide novel and improved methods and apparatus of such character.

2. Description of the Prior Art

While not limited thereto in its utility, the present invention is particularly well suited to use in and as a transversely excited laser. Transversely excited (TE) gas lasers which operate in a pulsed or CW (continuous wave) mode are known in the art. It is known in the art that, before such TE lasers can be efficiently energized with a dc pulse, preionization must be supplied to the region which subsequently becomes the laser gain medium. It is also known that, subsequent to excitation, gas recirculation or replacement of the laser medium must be provided beyond a repetition frequency of about a few pulses per second to prevent discharge arcing.

FIG. 1 schematically illustrates the major elements of a conventional ultra-violet preionized, thyratron switched, transversely excited $CO_2$ laser. These elements include a pair of solid metal main discharge electrodes 1 and 2, at least one of the electrodes 2 being shaped in the interest of establishment of a uniform electric field in the region between the electrode pair. Additionally, the prior art TE laser devices have customarily employed a series of preionizing electrodes 4 located adjacent to, and typically downstream of in the direction of gas flow, the space between the electrodes where the discharge will occur. As will be briefly discussed below, preionization can be accomplished in several different ways. Thus, by way of example, the preionizer electrodes may be arranged as a series of oppositely positioned "pins". Typically, the sets of pins are mounted from the upper and lower interior surfaces of the laser vacuum envelope. The application of a high voltage pulse between the pins of the sets causes the generation of an intense linear array of sparks. The ultra-violet light from these sparks, in turn, generates photo-electrons in the volume adjacent to the spark array. The energy disposition in the sparks is typically about 10% of the total energy subsequently applied to the main discharge electrodes to generate laser oscillation.

Continuing to discuss the prior art as schematically represented in FIG. 1, the energy for generating the linear array of sparks is typically stored in a capacitance, such as capacitor $C_s'$, the capacitance being charged from high voltage source $V_s'$ to the appropriate voltage through an inductance such as indicated at $L'$. The inductance $L'$ is chosen, taking the pulse repetition frequency into account, such that its reactance will not prevent the capacitance $C_s'$ from charging in the laser inter-pulse period, while at the same time the reactance will be sufficiently high as to not shunt current away from the spark array. The voltage pulses delivered to the spark array may, for example, be provided by exercising control over a switching device SW1 such as a thyratron. Thus, in the prior art system depicted, the application of a positive pulse to the control grid of the thyratron results in a negative going pulse being generated and applied to the spark array, i.e., the anode voltage of the thyratron is driven to an impedance level of a few ohms above ground for a period measured in tens or hundreds of nanoseconds. When the optimum ionization level is developed in the region between the two main discharge electrodes, due to the absorption of the uv spark protons and subsequent generation of photo-electrons, a second voltage pulse from a main storage capacitance $C_s$ is applied across the laser main discharge electrodes. The energy delivered to the discharge volume from capacitance $C_s$ is usually on the order of ten times that of the preionization energy. The control of the coupling of energy into the laser gain volume from capacitance $C_s$ is achieved by the use of a second switch (thyratron) SW2.

While various modifications and improvements to the circuit depicted schematically in FIG. 1 have been proposed and implemented, the net result of such improvements has been to only improve the laser output from a given device volume at the expense of more complicated electrode structure and discharge circuit complexity. Thus, all of the prior art preionized pulsed TE lasers share several fundamental characteristics. Firstly, the magnitude of the voltage pulse which generates the initial preionization sparks must be at a level which is substantially above the breakdown level of the laser gas mix taking into account the pin shape and pin spacing. Further, because the level of photoelectrons available for preionization is not volumetrically dense, as a result of the fact that a small fraction of the preionizer circuit energy ends up as uv photons, the voltage pulse coming from the energy stored in the main capacitance $C_s$ (or the voltage to which the capacitance $C_s$ must be charged) must also be above the gas breakdown level taking the main discharge electrode spacing into account. If the $C_s$ capacitance voltage is not above the breakdown level, all of the energy stored in this capacitance will be dumped either into the charging inductor L or into the switching device SW2 when the switching device in the main discharge circuit is activated. Further, experience has shown that, beyond a discharge repetition frequency of about one or two pulses per second, prior art pulsed TE gas lasers require some sort of intravacuum gas recirculation or convective gas flow to prevent discharge arcing on the second consecutive discharge pulse. It is to be noted that this requirement for gas recirculation cannot be avoided by achieving preionization through the use of corona discharge or by generating photo-electrons through the use of an x-ray source or flash lamps having an output rich in uv emission.

To summarize the above, the prior art uv or corona preionization techniques all require more than two electrodes in the laser vacuum envelope and, typically, require such a substantial number of electrodes as to introduce significant complications and compromises in material selection, material compatibility and overall device design. Further, the prior art preionization schemes all require intravacuum gas flow in order to reliably achieve pulse repetition frequencies of greater than one or two pulses per second and, accordingly, require comparatively large device volume and have both a life expectancy and reliability which is suspect due to the necessity of having rotating mechanical elements interior to the vacuum envelope. Additionally, the prior preionization schemes have all required the use of at least one active switching device in the main discharge circuit and thereby have been characterized by circuit complexity and limited service life.

To further discuss the prior art, a "pulser"/"sustainer" system for $CO_2$ transverse laser excitation is discussed in an article by J. P. Reilly which appeared in the Journal of Applied Physics, Volume 43, No. 8, August 1972. The technique discussed in the Reilly article employs a low energy level pulsed discharge to provide ionization to initiate the deposition of energy from an "unswitched" more energetic discharge circuit. The approach discussed in this article employed a combination of a highly overvoltaged "pulser" or preionizer discharge pulse, numerous interlevered pulser/sustainer electrodes and mach 0.2 intravacuum gas flow. The principles of operation as described in the Reilly article are very similar to electron beam controlled laser devices subsequently described by Fenstermacher et al (see Applied Physics Letters, Volume 20, pages 56–60, 1972) and Stratton et al (Journal of Quantum Electronics, Volume QE 9, No. 1, 1973). The pulser portion of an electron beam controlled laser device comprises a hot cathode electron gun located in a "hard" vacuum chamber. One wall of this chamber is at least in part defined by a titanium foil supported by a metal grid, the foil being substantially transparent to accelerated electrons from the electron gun. In actual practice, electron beam type ionizer sustainer devices have suspect reliability in view of the very high voltages required to accelerate the electron beam, the types of switches needed to activate the electron gun and the fragile nature of the foil electrode. Additionally, the location of the electron gun vacuum chamber in one of the walls of the laser vacuum envelope severely impairs heat removal from the lasing gas. Thus, it is believed that, as is the case with the above-discussed uv or corona preionization schemes, intravacuum gas flow is required in order to achieve pulse repetition frequencies beyond about one or two pulses per second.

In summary, the pulsed E-beam, UV, flashlamp or corona preionized TE lasers apply one or more types of preionization and main discharge excitation by multiplexing several such sources in time (one source activated after another) or space (different electrodes, different regions of gas).

In similar fashion to the pulsed transverse gas lasers, transverse cw dc excitation between only two simple extended metal electrodes, in a sealed-off non-recirculating device, has proven to be impractical. Without some turbulence due to gas flow or some other gas discharge destabilizing influence, for example due to charged particle-magnetic field induced forces, a desirable glow discharge in the laser medium rapidly localizes to one small region between the electrodes and collapses into an undesirable arc. The beneficial features of simplicity and reduced laser cost attendant to using only two electrodes in a transversely excited cw gas laser are so compelling that, over the last decade, much work has gone into teaching how to generate such two electrode cw discharges. In order to prevent the collapse of the desirable glow discharge into an arc, some mechanism to prevent the formation of the arc is necessary. One such mechanism might be the use of intravacuum convective gas flow which will transport the high temperature gas in the early stages of the glow to arc transition to an adjacent region of the gas thereby inhibiting the development of an arc. Another mechanism would be to use an externally applied magnetic field to induce forces on the charged particles in the discharge in a manner that destabilizes the arc. All of these techniques run counter to the desire to provide a less complicated device. The the past decade the thrust of the sealed-off laser development has been to provide a mechanism which prevents the formation of the glow to arc transition at a more fundamental level. Thus, the teachings in U.S. Pat. No. 4,169,251 by Laakmann point out the need to use an "excitation frequency [col. 2 line 51] sufficiently high to ensure negligible interaction of discharge electrons with the electric field-applying electrodes". Or, as indicated in U.S. Pat. No. 4,373,202 by K. D. Laakmann and P. Laakmann, [col. 2, line 38]"the overall laser efficiency for the transverse RF discharge of the prior art device suffers due to low laser head efficiency if the RF drive frequency is below the desirable minimum", thereby necessitating the use of the longitudinal RF discharge excitation approach as taught in that patent. As indicated in the invited paper entitled "RF Excited Waveguide $CO_2$ Laser Technology" at the Lasers '82 Conference by Chenausky and Newman, "The principal distinguishing feature of transverse RF excitation is that the 'transient basis' of the applied discharge voltage is supplied in the form of a polarity reversing AC electric field with a frequency typically in the range of 20 MHz. to 200 MHz. The only general requirement which seems to be relevant is that for any particular discharge geometry and operating conditions, the field reversal time must be short relative to the growth time of an unwanted plasma instability." The advantages of transverse cw RF excitation are amply discussed in U.S. Pat. Nos. 4,363,126 [Chenausky et al], 4,438,514 [Chenausky et al], 4,443,877 [Chenausky and Newman] and 4,719,640 [Chenausky et al].

Therefore, based on these teachings, substantial transverse dc excitation between two extended metal electrodes will be unsuccessful because either the frequency will be too low (DC), resulting in a non-negligible interaction with the discharge electrodes or will lack some destabilizing mechanism for the formation of an arc, such as the transient nature of the polarity reversing discharge electric field. Transient transverse dc excitation can be successful only if it is preceded with at least space multiplexed and time multiplexed preionization means.

SUMMARY OF THE INVENTION

The present invention overcomes the above-briefly discussed and other deficiencies and disadvantages of the prior art by providing a novel and improved technique for achieving co-volumetric, co-temporal gaseous discharge in the optical cavity of a laser. The present invention also encompasses an improved gas laser which operates in accordance with this novel technique and, while so doing, is characterized by enhanced efficiency and reduced complexity when compared to the prior art. A laser system in accordance with the present invention is further characterized in that only two electrodes are used and operation in the pulsed mode can be achieved at a comparatively high pulse repetition frequency and without using intravacuum gas flow. Also, surprisingly, cw excitation can also be achieved without the use of gas flow or other complicated destabilizing mechanisms.

In accordance with the present invention, a low energy circuit, i.e., a circuit which supplies a comparatively small amount of energy to the gas discharge, commutes a non-switched higher energy circuit. The low and high energy circuits operate at different frequencies and, in accordance with the invention, the high energy circuit comprises a source of direct current of either polarity or an unrectified source of low to medium frequency alternating current. The low energy circuit will comprise a source of higher frequency alternating current and, in accordance with the preferred embodiment, will be an RF power or energy source. The magnitude of the voltage provided by the low energy alternating current source will be selected to be in excess of the breakdown voltage of the gas in the laser optical cavity. The maximum voltage level of the high energy circuit will be selected to be less than the laser medium breakdown voltage and can be independently set at an electric field to pressure ratio (E/P) from zero to that needed for optimum laser excitation, optimum laser medium gain or maximum laser output.

A particularly attractive feature of the present invention is that only a pair of rugged, easily cooled, solid metal electrodes are required and thus the number of components located in the laser vacuum envelope is minimized. Further, the present invention allows the output power of the laser to be easily changed by changing the voltage of lower frequency, high power or high energy source. Also, the present invention allows the vacuum envelope to be comprised of metal and thus easily cooled.

DESCRIPTION OF THE DRAWING

The present invention may be better understood, and its numerous objects and advantages will become apparent to those skilled in the art, by reference to the accompanying drawing wherein like reference numerals refer to like elements in the several FIGURES and in which.

DESCRIPTION OF THE DISCLOSED EMBODIMENT

Figure 2:
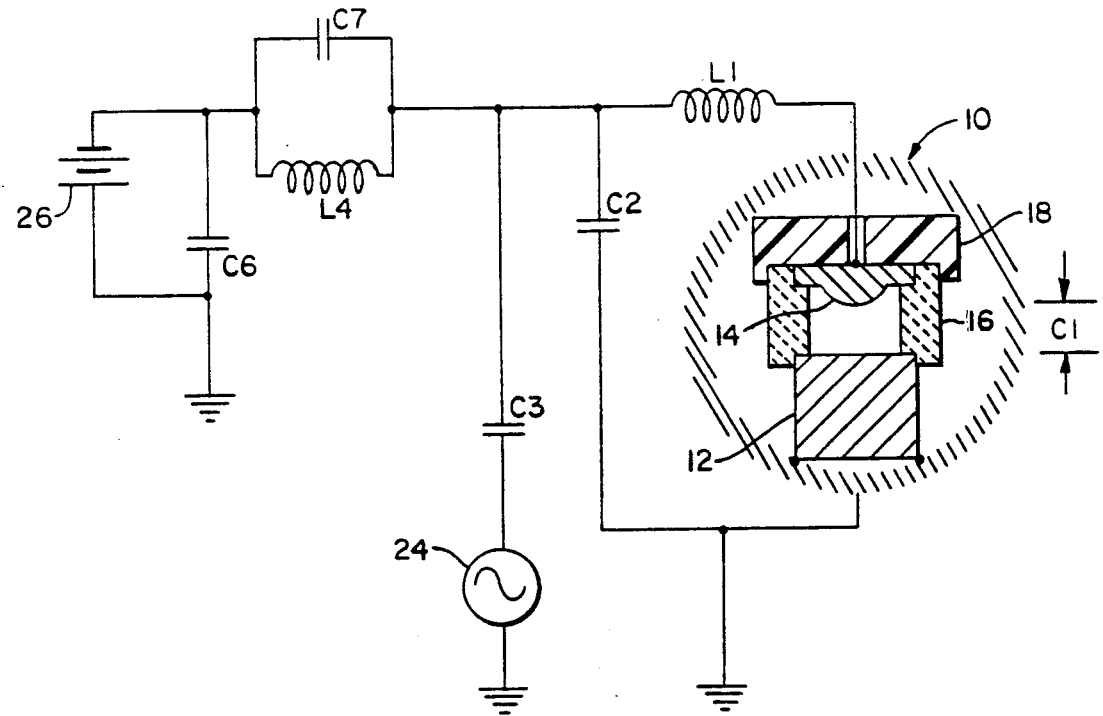
FIG. 2 is a schematic diagram of a laser in accordance with the present invention.
Figure 3:
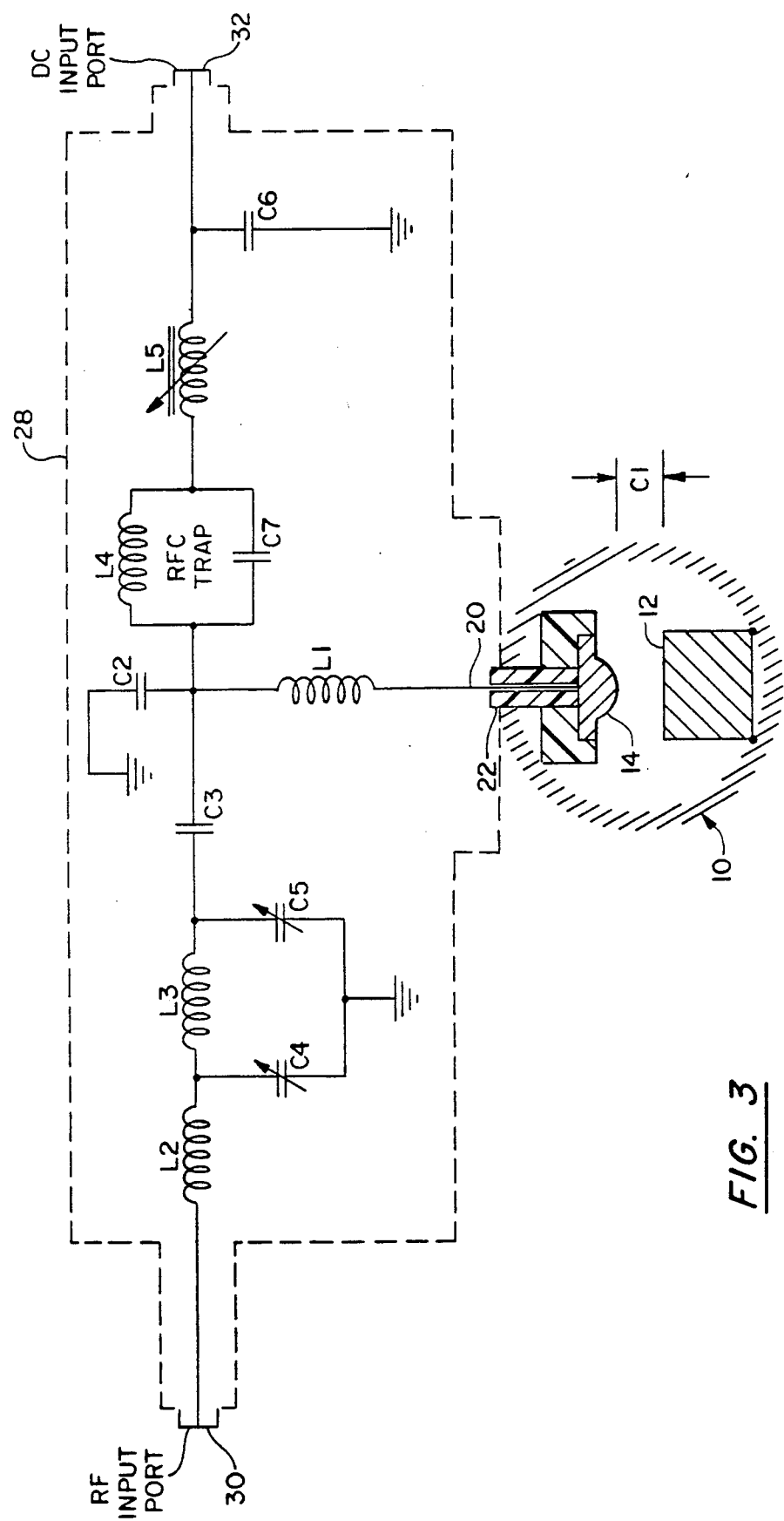
FIG. 3 is a schematic diagram, in somewhat more detail, depicting the laser system of FIG. 2.

With reference now to FIGS. 2 and 3, a laser circuit in accordance with a preferred embodiment of the present invention is shown schematically. In FIGS. 2 and 3, the laser vacuum envelope is indicated generally at 10. A planar grounded electrode 12, a shaped second electrode 14, a ceramic spacer 16 and further non-conductive spacer 18 are positioned within vacuum envelope 10. The shaped electrode 14 will typically be curved, i.e., Chang or Rogowski type profile for high pressure pulsed lasers, but may be nearly planar for low pressure cw lasers. The ceramic spacer 16 will set the spacing between the upper electrode 14 to which the elevated desired potential is applied and the grounded lower electrode 12. The spacer 18 receives and supports the upper electrode 14 and the spacer 16. An electrical connection to electrode 14 will be established from the exterior of vacuum envelope 10, typically via a single conductor connector mounted in the envelope wall and appropriately sealed thereto. The electrical connection may, within envelope 10, include a conductor 20 which extends axially of a Teflon or ceramic rod 22 which is fitted into a hole bored through spacer 18. The vacuum envelope 10 will typically be comprised of metal and will be grounded as shown. Electrodes 12 and 14 cooperate to define an internal capacitance C1 and, in the disclosed embodiment, the region where a transverse discharge will be established. The laser circuit also includes a second, external capacitance C2 which has a first plate connected to electrode 12, i.e. a first plate of capacitor C2 is grounded. An inductor L1 is connected between electrode 14 and the other plate of capacitor C2. Capacitor C2, inductor L1 and the internal capacitance C1 cooperate to define a pi impedance matching network. Thus, capacitor C2, inductor L1 and capacitor C1 function in the manner discussed in U.S. Pat. Nos. 4,751,717 and 4,809,284, as a fixed turns ratio RF transformer which presents a low impedance to RF energy at the operating frequency. The RF energy source is indicated in FIG. 2 at 24. Source 24 is coupled to the fixed turns ratio RF transformer C2, L1, C1 via a capacitance C3. In actual practice, prior to determining the operating impedance level of the preionization discharge as shown in FIG. 3, a variable impedance matching network comprising capacitors C4 and C5 and inductors L2 and L3 is connected between the RF source 24 and the impedance matching network. Accordingly, the RF energy source impedance can be matched to the impedance of the laser, when the gas is being energized, over a wide variety of pumping conditions and gas mixtures. In accordance with one reduction to practice, where the RF energy source was operated at 27.12 MHz the impedance matching network comprising inductor L1 and capacitance C1 and C2, transformed the discharge impedance level of the laser to approximately 50 ohms.

Pulsed dc energy is supplied to the laser by means of discharging a capacitance C6 which is charged from a DC current source 26. Alternatively, DC or unrectified low frequency AC power is supplied to the laser from a suitable source 26. A suitable filter, represented by inductance L4 and capacitor C7 in FIG. 2, which are in parallel resonance for the frequency of source 24, prevents the transmission of RF energy to the AC/DC source 26. Restated, the AC/DC energy or power source 26 is RF blocked by the filter which acts as an RF trap. The RF energy source 24 is protected against source 26 by capacitor C3. As shown in FIG. 3, a variable inductor L5 may be connected in series with the DC energy source and the laser impedance matching network in order to initially moderate the current rise time from source 26 into the laser discharge. Restated, inductor L5, when employed, functions to initially delay the flow of direct current from capacitor C6 to the gas discharge to ensure that the gas in the laser cavity is substantially fully ionized prior to the delivery of energy from the high energy source to the discharge.

All of the above-described components, with the exception of the high and low energy sources, respectively the direct current or unrectified alternating current source 26 and the higher frequency preionizing source 24, will typically be mounted within a shielded enclosure 28 which, in turn, is attached to, and typically mounted from, the vacuum envelope 10 as indicated by the broken line showing from FIG. 3. FIG. 3 depicts the RF input port at 30 and the DC input port at 32.

The laser, of course, includes an optical cavity which, in part, is defined by a pair of spaced oppositely facing mirrors. The gas discharge will occur in the region between these mirrors and between electrodes 12 and 14. In one reduction to practice, wherein both electrodes were made from aluminum and the minimum spacing between the electrodes was 1 cm; electrode 12 was flat and electrode 15 was slightly rounded at the endpoints to slightly increase the electrode spacing, the pulsed RF/DC laser was operated at a pressure of 33 torr at repetition rates of over 200 HZ, completely sealed-off without any gas recirculation whatever. In this case the total average output power from the 1 cm by 1 cm by 17 cm long laser medium was 0.46 watts from an undercoupled, Fresnel number 9.1, gaussian free-space stable cavity using a 99% reflecting mirror at either cavity endpoint. The laser gas mixture used for these experiments was a $CO_2$-$N_2$-He:4.5%-13.5%-82% and the maximum output power was obtained with a DC voltage of 400 volts, or at an E/P of 12 volts per cm torr.

In another reduction to practice, wherein both electrodes were made from stainless steel and flat electrode 12 was held at a constant 1.07 cm spacing by an aluminum oxide spacer 16 from a nominal 13.5 cm long Chang Profile with k=0.2 (T. Y. Chang, "Improved Uniform-Field Electrode Profiles for TEA Laser and High Voltage Applications", Review of Scientific Instruments Vol. 44 No. 4, April 1973, page 405–407), a laser output energy of 73 mJ/pulse at a pulse repetition frequency of greater than 10 Hz. was obtained at a pressure of 225 torr when a 28 kilowatt, 1 usec. wide 27.12 MHz. RF pulse commuted 626 mJ from a 105 nF. capacitor charged to 3450 volts. In this case the total specific laser input energy of 146 J/LA was converted to laser output with an efficiency of 11.2% and only 28 mJ of RF energy was needed to titrate 626 mJ of DC energy from the unswitched main discharge energy source 26, for a DC/RF commutation ratio of 22:1, and at somewhat lower pressures commutation ratios of 70:1 were obtained. In accordance with the preferred embodiment, the vacuum envelope is sealed and only uncatalyzed mixtures of $CO_2$, $N_2$, and He were used and, accordingly, the device is a non-circulating, transversely excited laser.

In operation, energy from the higher frequency alternating current source 24 is applied between electrodes 12 and 14 in order to "preionize" the laser medium. Power from source 24 must be applied across electrodes 12 and 14 such that a voltage in excess of that needed to establish a weak gas discharge will be present. When a discharge is established in the optical cavity by the low energy source 24, a path for the discharge of capacitance C6 or a path for lower frequency, unrectified alternating current from source 26 will be created and energy will accordingly flow from the high energy source, i.e., the low energy source 24 will commute the high energy source 26, C6. One object of the prevent invention is to increase the output power from a cw laser by using less RF power and using instead less expensive DC or unrectified AC power. Another object of the present invention is to establish the preionizing discharge with a small amount of total discharge power and introducing the remaining laser input power from source 24 at the voltage which is most optimum for laser excitation, since it is well known in the art that the optimum voltage for excitation is lower than the voltage at which discharge breakdown occurs. Yet another object of the present invention is to have a simple means by which the output power of a conventional transversely RF excited pulsed or cw laser can be changed without having to correspondingly adjust the impedance matching network for the RF source 24. Still another object of the present invention is to achieve the highest ratio of the energy supplied to the discharge from source 26 to that of source 24. Experiments to date show that energy commutation ratios of at least as high as 70:1 can be achieved.

The economics of having substantial excitation provided via the source 26 is very important. A typical discharge efficiency for a 100 watt cw RF excited $CO_2$ laser might be in the range of 10%, and therefore about 100 watts of RF power must be applied to the laser medium to generate a 100 watt output. If a transverse discharge laser had an electrode spacing of about 1 cm and a pressure of about 25 torr, then if 500 of the 1000 watts could be furnished via the source 26, the voltage level for this source would only need to be about 5 V/cmT or about 125 volts. A waveguide laser with a 1/5 cm discharge gap operating at 125 torr would have similar voltage requirements. 500 watts of RF power could easily cost two dollars per watt more than a 500 watt, 125 volt DC supply. Also, a 125 volt 100 KHz. square wave source would be even less expensive because the AC would not have to be rectified thereby eliminating both the diode rectifiers and filter capacitors of the DC supply. In many cases the efficiency of the RF source may only be 50%, and therefore the reduction of 500 watts of system RF power means a reduction of 1000 watts of system prime power. Thus the use of the teachings of the present invention could reduce the manufacturing cost of a 100 watt cw laser by $1000 to $1500 in 1990 dollars.

For a 100 watt cw laser, if the laser output power is to be reduced to 10 watts, then typically, the laser input power must be reduced to 50 to 100 watts because the laser is usually more efficient at lower input powers. Over this input power range, the discharge impedance can change, using ohms law, by a factor of 10 to 20. Consequently a variable matching network must be provided which automatically matches the fixed RF source impedance and the laser discharge impedance. Using the teachings of the present invention, only the low frequency unrectified AC or DC voltage level need be changed, which is trivial when compared to providing a variable impedance matching network.

Figure 1:
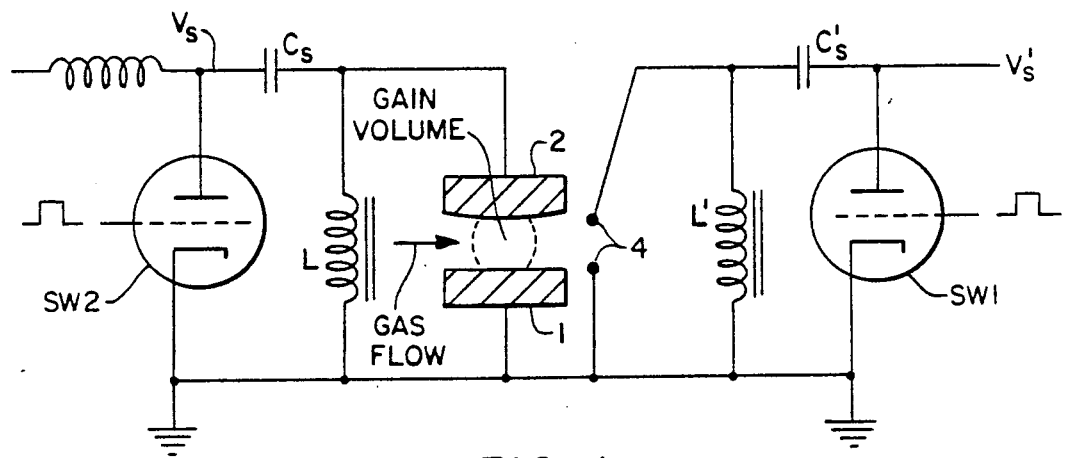
FIG. 1 is a schematic drawing of a preionized laser in accordance with the prior art.

A high commutation ratio is of particular importance in that it reduces the power requirements for an RF "preionization" energy source. With regard to achieving the highest possible commutation ratios, if a 10 J/pulse output from a short pulse $CO_2$ laser is desired, and if a laser is built with conventional technology, then a gas recirculator and multielectrode arrangement must be used. Using the teachings of this invention, for a discharge efficiency of 10% an output pulse width of 1 usec. and commutation ratio of 50:1, then the 100 joule/pulse input would be comprised of 98 J/pulse from an energy storage capacitor and 2 J/pulse from the RF preionization source. A 2000 KW, 1 usec pulse width, low duty cycle RF source is much preferred to having to use a gas recirculator. The size of such a laser system in accordance with the present invention is also minimized by the elimination of switching devices such as thyratrons as commonly employed in the prior art (see FIG. 1). The present invention also permits a reduction in laser complexity, and thus an enhancement in reliability, through the use of only two electrodes in the laser.

In summary, this invention concerns the multiplexing of two sources of excitation singularly in space and time, but differing in their carrier frequencies. Restated, the excitation sources co-ionize the laser medium co-temporarily and co-volumetrically but are multiplexed with respect to their carrier frequencies.

While a preferred embodiment has been described, various modifications and substitutions may be made thereto without departing from the spirit and scope of the invention. Accordingly, it is to be understood that the present invention has been described by way of illustration and not limitation.

What is claimed is:

1. A method for the production of coherent light by generating a high energy electrical discharge in a gaseous laser medium without the delivery of energy to the laser medium to cause preionization thereof, said method comprising the steps of:

applying a voltage from a first source of electrical power at a first frequency across a pair of spaced electrodes, the electrodes being positioned within the vacuum enclosure of a laser and the laser medium comprising a lasing gas mixture being disposed between the electrodes, said applied voltage from said first power source causing the establishment of a first electrical discharge in the laser medium whereby energy from said first source is deposited in said first discharge and;

depositing energy from a second source of electrical power into said first discharge in said laser medium, said second source providing a voltage at a frequency which is different than said first frequency, said second source being connected across said electrodes prior to application of said first source voltage across said electrodes, co-deposition of energy from said first source of power into said first discharge in said laser medium with energy from said second source of power occurring upon establishment of said first discharge whereby said first source supplies a comparatively small amount of energy to the gas discharge to commute the non-switched second source which supplies more energy to the discharge than said first source.

2. The method of claim 1 wherein the first power source is a cw source.

3. The method of claim 1 wherein the first power source is a pulsed source.

4. The method of claim 1 wherein the frequency of said first power source is higher than the frequency of said said second power source.

5. The method of claim 1 wherein the frequency of said first power source is lower than the frequency of said second power source.

6. The method of claim 1 wherein the second power source deposits power in the laser medium through an unswitched capacitive discharge.

7. The method of claim 1 wherein the power deposited in the laser medium by the second power source is stored in an inductance.

8. The method of claim 1 wherein the power deposited in the laser medium by the second power source is stored in a capacitance and inductance.

9. The method of claim 1 wherein the second power source applies an unrectified square wave across said electrodes.

10. The method of claim 1 wherein the second power source applies an unrectified sine wave across said electrodes.

11. The method of claim 1 wherein the output voltage of the second power source has a larger amplitude above zero volts than it does below zero volts.

12. The method of claim 1 wherein the output voltage of the second power source has a smaller amplitude above zero volts than it does above zero volts.

13. The method of claim 1 further comprising: delaying the delivery of power from the second power source to the laser medium upon initial establishment of the discharge.

14. The method of claim 1 further comprising the step of preventing the feedback of energy from the first power source to the second power source.

15. The method of claim 1 further comprising the step of: preventing the delivery of power from the second power source to the first power source.

16. The method of claim 1 wherein the length of said electrodes exceeds the spacing between said electrodes and the discharge is transversely excited by the application of a voltage between the electrodes.

17. The method of claim 16 wherein the spacing between said electrodes exceeds the length of said electrodes.

18. A laser comprising:

a vacuum enclosure;

a pair of elongated electrodes supported within said vacuum enclosure in spaced relationship;

an ionizable gas within said vacuum enclosure and between said electrodes;

an impedance matching network, said impedance matching network comprising at least a series connected inductance and a capacitance, said impedance matching network being connected between said electrodes of said spaced pair;

a first source of power, said first power source providing an alternating current voltage having a magnitude which is sufficient to ionize the gas between the spaced electrodes;

means coupling said first power source to said impedance matching network whereby the alternating current voltage is applied across said electrodes to thereby ionize the gas and establish a discharge through the gas between said electrodes, energy thereby being deposited in said discharge from said first source;

a second source of power, said second power source providing a voltage having a magnitude which is less than the breakdown voltage of the gas between said spaced electrodes; and means establishing a continuous path for the flow of current from said second power source to said impedance matching network whereby the said second source will be commuted by said first source and energy will be co-deposited from the said first and second power sources into the gas discharge when established by said first source, said first source suppling a comparatively small amount of energy to the gas discharge to commute the second non-switched source which supplies a greater amount of energy to the discharge than said first source.

19. A method for switching the energy stored in a capacitor into a load impedance comprising the steps of:

applying a voltage from a first source of electrical power at a first frequency across a pair of spaced electrodes, the electrodes being positioned within a vacuum enclosure and a gas mixture being disposed between said electrodes, said applied first power source voltage causing ionization of gas in said mixture whereby energy from said first source is deposited in the ionized gas; and depositing energy from a second source of electrical power into said ionized gas, said second power source providing a voltage at a frequency which is different than said first frequency, said second power source being connected in series with a load impedance across said electrodes prior to application of said first power source voltage across said electrodes, the ionization of said gas caused by application of said first source voltage causing energy from said second source to be deposited partially in said ionized gas and the series load impedance whereby said first source will supply a comparatively small amount of energy to the ionized gas to commute the non-switched second source which supplies a greater amount of energy to the ionized gas than said first source; energy from said first and second sources being co-deposited in the ionized gas.

20. A method for the generation of light comprising the steps of:
   connecting a first source of electrical power at one frequency across a pair of spaced electrodes, a gas being disposed between the electrodes,
   a second source of electrical power at a second frequency which differs from said first frequency having previously been connected across said electrodes, said first power source solely causing the establishment of an electrical discharge through the unenergized gas whereby energy from said second power source will be co-deposited in the gas with energy from the first source of power and the first source will supply a comparatively small amount of energy to the discharge to commute the non-switched second source which delivers a greater amount of energy to the discharge than said first source.

21. A method for producing a uniform high energy discharge in a high pressure gaseous medium between a pair of spaced-apart, substantially parallel electrodes, said method comprising the steps of:
   filling the region between the pair of spaced-apart electrodes with a gaseous medium;
   charging the pair of spaced-apart electrodes to a dc potential difference which is below the breakdown voltage of the gaseous medium; and
   producing a low energy discharge in the region between the pair of spaced apart electrodes without the delivery of pre-ionization energy to the medium whereby energy flow from said dc potential difference between the pair of spaced-apart electrodes will occur and a co-volumetric and co-temporal discharge will be initiated in the region between the electrodes, the low energy discharge supplying energy to commute a high energy discharge from said dc potential difference.

22. The method of claim 21 wherein the step of producing a low energy discharge comprises coupling a source of alternating current across the pair of spaced-apart electrodes, the magnitude of the voltage provided by said alternating current source being sufficiently great the cause ionization of the gaseous medium.

* * * * *

UNITED STATES PATENT AND TRADEMARK OFFICE
CERTIFICATE OF CORRECTION

PATENT NO. : 5,097,472
DATED : March 17, 1992
INVENTOR(S) : Peter P. Chenausky

It is certified that error appears in the above-indentified patent and that said Letters Patent is hereby corrected as shown below:

In column 9, line 44, delete "said" (first occurrence);
line 68, change "above" to --below--.

In column 10, line 51, change "suppling" to --supplying--.

Signed and Sealed this

Sixth Day of December, 1994

Attest:

BRUCE LEHMAN

Attesting Officer    Commissioner of Patents and Trademarks